March 19, 1963     O. P. LIEBREICH     3,082,042
SAFETY COASTER BRAKE
Filed March 29, 1961     2 Sheets-Sheet 1
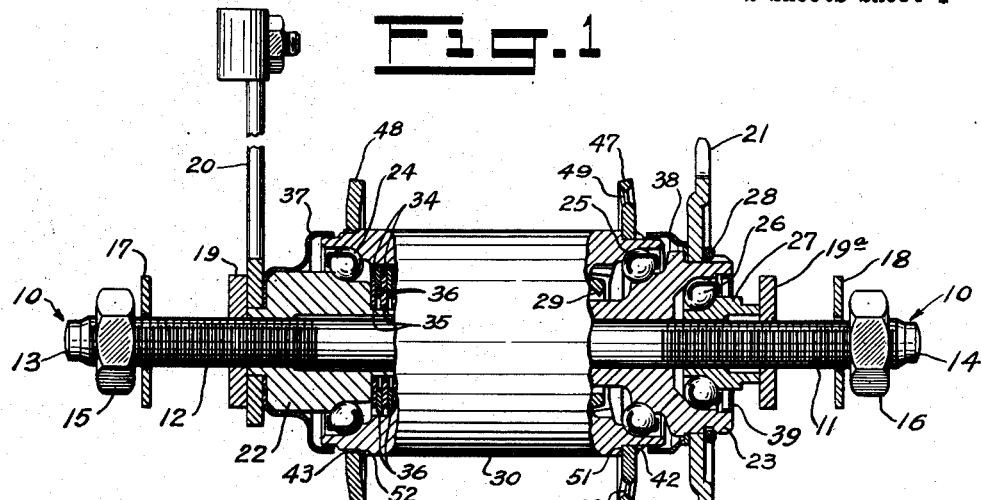
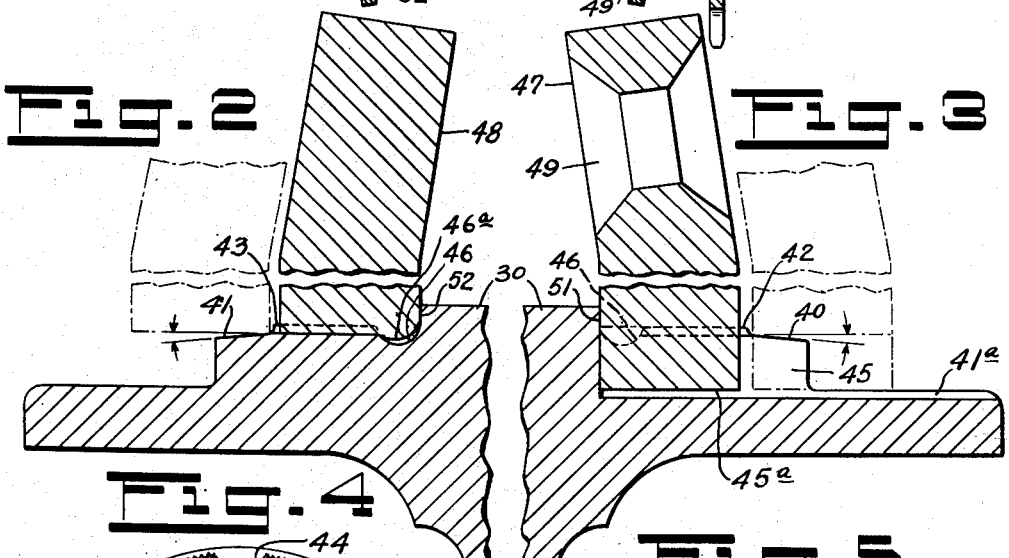
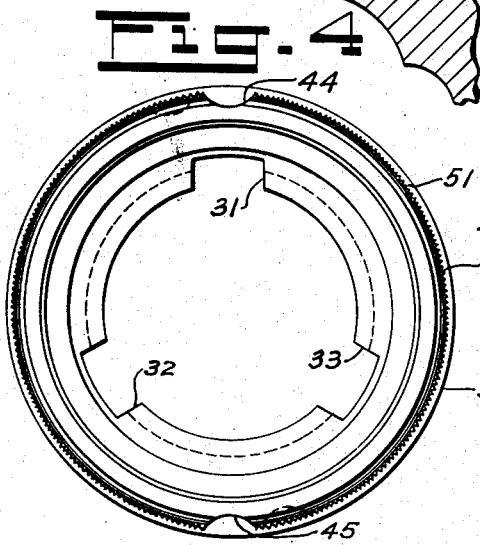
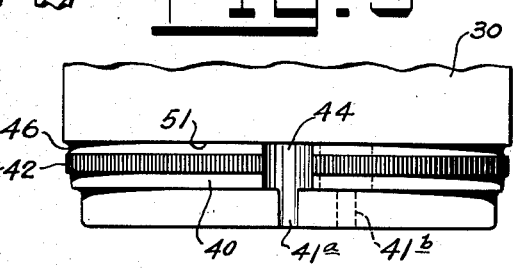
INVENTOR.
OSCAR P. LIEBREICH
BY
H. G. Manning
ATTORNEY March 19, 1963 O. P. LIEBREICH 3,082,042
SAFETY COASTER BRAKE
Filed March 29, 1961 2 Sheets-Sheet 2
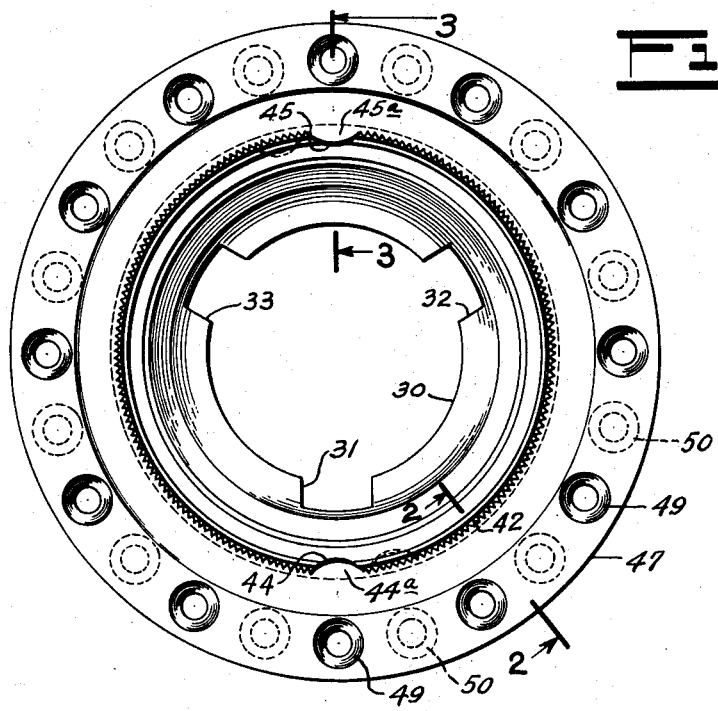
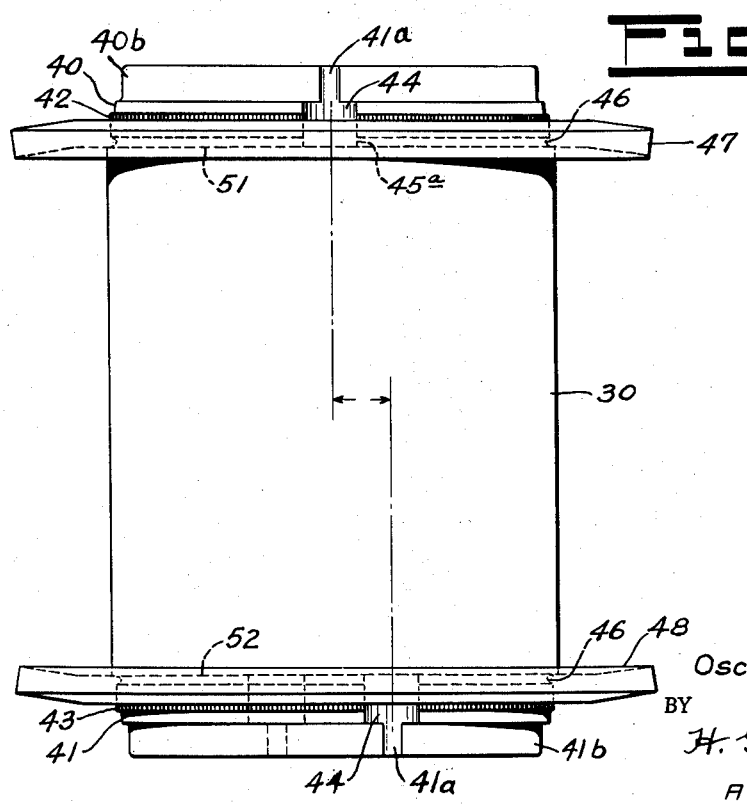
INVENTOR.
OSCAR P. LIEBREICH
BY
H. G. Manning
ATTORNEY

United States Patent Office 3,082,042
Patented Mar. 19, 1963

3,082,042
SAFETY COASTER BRAKE
Oscar P. Liebreich, Waterbury, Conn., assignor to The Mattatuck Manufacturing Company, Waterbury, Conn., a corporation of Connecticut
Filed Mar. 29, 1961, Ser. No. 99,223
2 Claims. (Cl. 301—105)

This invention relates to clutch retarding mechanisms and more particularly to an improved multiple disk safety coaster brake for bicycles and other mechanisms.

One object of the present invention is to provide an improvement on a back pedaling coaster brake comprising a three-part construction including a polished hardened hollow hub shell and a pair of power press assembled spoke flanges having a force fit upon hardened spline rims on said hub shell, said flanges being provided with interior drive lugs fitting corresponding recesses in said spline rims to insure precision staggering of the spoke holes in the opposed spoke flanges and to assist in driving the entire wheel rim and tire by said hub shell.

A further object is to provide a coaster brake hub shell of the above nature in which curved relief grooves are provided at the inside of each of the spline rims, into which the inner end of the softer material of the swaged spoke flanges will flow to produce a positive mechanical lock, thus augmenting the swaged press fit of said flanges upon the splined rims and assisting in holding said spoke flanges securely in place.

A still further object of this invention is the provision of the hub shell of a pair of tapered pilot necks which assist the operator in guiding the drive lugs of the spoke flanges by "touch" into alignment with the opposed arcuate recesses on the exterior circumference of the hub shell spline rims.

A further object is to provide a coaster brake hub shell in which the spoke flanges are located radially at right angles to said hub shell so as to increase the "hoop strength" of said flanges and prevent said flanges from spreading outwardly when they are fastened upon the splined sections of the hub shell.

A further object is to provide a coaster brake of the above nature which will be relatively simple in construction, inexpensive to manufacture, which will not loosen in service, which will be easy to install and manipulate, compact, ornamental in appearance, and very efficient and durable in use.

With these and other objects in view, there has been illustrated on the accompanying drawings, one form in which the invention may conveniently be embodied in practice.

In the drawings:

FIG. 1 represents a side view, partly in section, of a multiple disc safety coaster brake mechanism embodying the present invention.

FIG. 2 is a fragmentary longitudinal section on an enlarged scale, taken on the line 2—2 of FIG. 6, showing in dotted lines the position of one of the spoke flanges prior to its assembly on the splined section of the hub, and showing in full lines the final position of said spoke flange.

FIG. 3 is a fragmentary longitudinal sectional view similar to FIG. 2, taken on the line 3—3 of FIG. 6, showing the relative positions of one of the spoke holes and a driving lug.

FIG. 4 is an end view of the coaster brake hub shell, showing one of the pair of exterior spline rims with its two opposed outer recesses in the circumference thereof, for receiving the lugs of the spoke flanges, and also showing the three keyway slots in the interior of said hub shell for receiving the lugs of the brake discs.

FIG. 5 is a fragmentary side view of the same.

FIG. 6 is an end view of the hub shell with one of the spoke flanges in assembled position, showing in dotted lines the staggered location of the spoke holes of the flange at the opposite end of said hub shell, and also showing the drive lugs in the spline recesses.

FIG. 7 is a side view of the assembled hub shell showing the pair of spoke flanges at the opposite ends thereof, and illustrating the angular offset relationship between the outer slots in the hub shell which serve to maintain the proper staggered positions of the spoke holes of the respective spoke flanges, and showing the location of the diametrically opposite slots and recesses in said hub shell.

In order to effectively lock the pair of spoke flanges upon the hub shell of the coaster brake herein disclosed, the diameter of the central aperture of said flanges will be made a few thousandths of an inch smaller than the diameter of the knurled case hardened spline rims located at the ends of the hub shell. By means of this construction, the soft metal or other material of the flanges will be swaged, causing them to have an extremely tight fit upon the spline rim sections.

By the use of the arcuate recesses on the hub shell the assembly of each spoke flange is assured of being accurately concentric with said hub shell, and it will be seen that the offset driving lugs on the inside of said spoke flanges will hold the spoke holes in proper staggered relationship at the opposite ends of the hub shell.

In previous safety coaster brakes it was customary to attach the spoke flanges to the hub shell by welding, copper brazing or other methods involving the use of heat, which were unsatisfactory owing to the danger of warping of the spoke flanges and the formation of scale, making it difficult to fit said flanges upon said hub shell.

By means of the present invention, the spoke flanges are fastened to the hub shell by a "cold" method, which is far superior to the "hot" methods, as it eliminates the above mentioned disadvantages.

The general structure of coaster brake herein illustrated is well known and is fully disclosed in the expired prior patent to Murden, No. 2,049,972 for Retarder, dated August 4, 1936.

Referring now to the drawings in which like reference numerals denote corresponding parts throughout the several views, the numeral 10 indicates a horizontal stationary axle of a bicycle or other machine upon which the coaster brake is to be mounted. The axle 10 is provided with opposite threaded end sections 11 and 12, which have reduced unthreaded tips 13 and 14. The usual nuts 15, 16, 19, 19a are mounted upon the threaded sections 11, 12 of the axle 10, and the usual washers 17, 18, are also located on said threaded sections 11, 12. The numeral 20 indicates the usual brake arm, and the numeral 21 shows a sprocket wheel by means of which a hub shell 30 is driven forwardly by means of a sprocket chain, (not shown), and which also actuates the brake elements of the coaster brake, when reversed. The numeral 22 indicates a disc carrying brake anchor member, and the numeral 23 designates a driver member of standard construction.

The numerals 24, 25, 26 indicate three sets of ball bearings of the construction usually employed in coaster brakes of this general nature. The numeral 27 indicates a cone which serves to simultaneously adjust all three of the ball bearings 24, 25, 26. The numeral 28 indicates an open spring wire snap ring for locking the sprocket wheel 21 in operating position, as clearly shown in FIG. 1.

Provision is also made of a rotatable and longitudinally slidable threaded connector 29 having a conical end for engaging a socket in the hub shell 30 for driving same. The connector 29 has steep pitch interior threads (not shown) for engaging similar exterior threads on the driver member 23.

The usual brake actuator (not shown) is slidably but non-rotatably mounted upon the anchor member 22 and has end teeth adapted to intermesh with corresponding teeth upon the end of the connector 29, so that when back pedaling, said connector 29 will be forced to the left and will cause said actuator to squeeze together the two sets of alternating brake discs 34 and 36, with the result that the hub shell 30 is retarded Each of the braking disks 34 has three radial lugs 35 which are adapted to be located in the three longitudinal grooves or keyways 31, 32, 33 (FIG. 4). The intermediate brake discs 36 are keyed to the anchor member 22 in the usual manner.

At the end of the hub shell 30, provision is made of a pair of usual dust excluding caps 37, 38 and an end plate 39 to protect the ball bearing 26, as clearly shown in FIG. 1.

The ends of the hub shell 30 are also provided with conical tapered pilot necks 40, 41 having cylindrical ends 40a, 40b, in which are clearance slots 41a. Provision is also made of a pair of arcuate lugs 44a and 45a (FIG. 6) on the inside of a pair of spoke flanges 47, 48. The spoke flanges 47, 48 are inwardly offset slightly, near their outer edges so as not to interfere with the lay or alignment of the spokes.

Provision is also made of a pair of case hardened knurled or serrated integral spline rims 42, 43 near the ends of the hub shell 30. The spline rims 42, 43 are provided with a pair of cut-out arcuate recesses 44, 45 for receiving the arcuate lugs 44a, 45a, of the spoke flanges 47, 48.

At the inner sides of the spline rims 42, 43, the hub shell 30 is provided with a pair of inner annular relief grooves 46 into which the stressed and strained "cold worked" material of the spoke flanges 47, 48 is adapted to flow inwardly around the ends of said spline rims 42, 43 after said spoke flanges have been assembled in position over said spline rims by power press swaging, thus forming interior locking ribs 46a.

The spoke flanges 47, 48 are provided with the usual spoke receiving holes 49, 50, the holes 49 of one flange being staggered with respect to the holes 50 of the opposite spoke flange. The numerals 51, 52 indicate hub shoulders against which the spoke flanges are caused to abut during the assembly operation.

*Operation*

In the operation of this invention, during the power press assembly of the spoke flanges 47, 48 over the hardened spline rims 42, 43, the cold worked material of said flanges will yield inwardly and flow into the relief grooves 46 adjacent the shoulders inside said spline rims to form positive interior locking ribs 46a It will be understood that the arcuate recesses 44, 45 of the tapered pilot necks 40 outside of said spline rims 42, 43 serve to permit the two drive lugs 44a, 45a on the inside of the spoke flanges 47, 48 to be brought by "touch" into alignment with said recesses 44, 45, prior to the forcing of the flanges thereon by power swaging, thus facilitating the manual or "automated" assembly.

While there has been disclosed in this specification one form in which the invention may be embodied, it is to be understood that this form is shown for the purpose of illustration only, and that the invention is not limited to the specific disclosure, but may be modified and embodied in various other equivalent forms without departing from its spirit. In short, the invention includes all the modifications and embodiments coming within the scope of the following claims.

Having thus fully described the invention, what is claimed as new and for which it is desired to secure Letters Patent is:

1. In a cylindrical hub shell for a safety coaster brake of the class described, said shell having shoulders adjacent each end thereof, and also having an annular groove located outside each shoulder and extending into said hub shell, a pair of annular hardened serrated spline rims rigidly mounted on said hub shell beyond and adjacent said grooves, and a pair of radial circular apertured spoke flanges extending at right angles to the axis of said shell mounted on said spline rims by swaging, the inner portions of said spoke flanges having interior ribs of material which flowed automatically by physical contraction into said grooves after the inner portions of said spoke flanges have passed over said spline rims during the longitudinal inward movement of said spoke flanges when they are pushed tightly against said shoulders.

2. The invention as defined in claim 1, in which said spline rims are provided with a pair of opposed arcuate inwardly extending recesses, and said spoke flanges have a pair of corresponding opposed arcuate outstanding lugs adapted to fit within said recesses for holding the apertures of said spoke flanges in their proper staggered angular relationship.

References Cited in the file of this patent

UNITED STATES PATENTS

| | | |
|---|---|---|
| 1,511,291 | McGrath | Oct. 14, 1924 |
| 1,919,552 | Hasselquist | July 25, 1933 |
| 2,049,972 | Murden | Aug. 4, 1936 |
| 2,213,165 | Kurzia | Aug. 27, 1940 |
| 2,357,188 | English | Aug. 29, 1944 |

FOREIGN PATENTS

| | | |
|---|---|---|
| 320,276 | Great Britain | Oct. 10, 1929 |
| 360,079 | Great Britain | Nov. 5, 1931 |